(12) United States Patent
Agarwal et al.

(10) Patent No.: US 8,869,032 B2
(45) Date of Patent: *Oct. 21, 2014

(54) TELECOM WEB BROWSERS, AND METHODS FOR DEFINING A TELECOM WEB BROWSER

(75) Inventors: Sheetal K. Agarwal, Maharashtra (IN); Dipanjan Chakraborty, Kolkata (IN); Arun Kumar, New Delhi (IN); Amit Anil Nanavati, New Delhi (IN); Nitendra Rajput, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 1155 days.

This patent is subject to a terminal disclaimer.

(21) Appl. No.: 12/047,535

(22) Filed: Mar. 13, 2008

(65) Prior Publication Data

US 2009/0232287 A1 Sep. 17, 2009

(51) Int. Cl.
*G06F 3/16* (2006.01)
*G06F 3/00* (2006.01)
*H04M 3/493* (2006.01)
*G10L 15/26* (2006.01)
*H04M 3/56* (2006.01)
*H04M 3/58* (2006.01)
*H04R 3/00* (2006.01)

(52) U.S. Cl.
CPC .......... *H04M 3/4938* (2013.01); *G06F 3/165* (2013.01); *G06F 3/167* (2013.01); *H04R 3/005* (2013.01); *G10L 15/265* (2013.01); *H04M 3/56* (2013.01); *H04M 3/58* (2013.01); *H04M 2201/40* (2013.01); *Y10S 715/978* (2013.01)
USPC ........... 715/728; 715/716; 715/727; 715/978

(58) Field of Classification Search
CPC ... G06F 3/0484; G06F 3/167; G06F 3/04886; G10L 15/22; G10L 15/08
USPC ........ 715/728, 716, 727, 978; 704/270.1, 275
See application file for complete search history.

(56) References Cited

U.S. PATENT DOCUMENTS

| | | | | |
|---|---|---|---|---|
| 5,453,986 A * | 9/1995 | Davis et al. | ................... | 370/259 |
| 5,619,508 A * | 4/1997 | Davis et al. | ................... | 370/495 |
| 5,721,783 A * | 2/1998 | Anderson | ................... | 381/328 |
| 5,764,628 A * | 6/1998 | Davis et al. | ................... | 370/271 |
| 6,101,473 A * | 8/2000 | Scott et al. | ................... | 704/275 |
| 6,141,413 A * | 10/2000 | Waldner et al. | ........... | 379/88.17 |
| 6,363,422 B1* | 3/2002 | Hunter et al. | ................. | 709/224 |
| 6,363,423 B1* | 3/2002 | Chiles et al. | ................. | 709/224 |
| 6,374,223 B1* | 4/2002 | Donaldson et al. | ........... | 704/260 |

(Continued)

OTHER PUBLICATIONS

Kenneth G. Rehor, "Voice Browser Using a Telephone", vol. 1, Issue 1, Jan. 2001. pp. 1-6.*

(Continued)

*Primary Examiner* — Ece Hur
(74) *Attorney, Agent, or Firm* — Gibb & Riley, LLC (57) ABSTRACT

A method of defining a voice browser for browsing a plurality of voice sites, at least some of the voice sites having different telephone numbers, the voice sites being configured to be accessed by telephone, is provided including storing information relating to voice sites visited by a voice user; and providing forward and back functions, comprising transferring a user from one voice site to another, in response to commands by the user. Computer program code and systems are also provided.

19 Claims, 4 Drawing Sheets

(56) References Cited

U.S. PATENT DOCUMENTS

| | | | |
|---|---|---|---|
| 6,480,890 B1 | 11/2002 | Lee, Jr. et al. | |
| 6,516,323 B1 | 2/2003 | Kamba | |
| 6,560,576 B1* | 5/2003 | Cohen et al. | 704/270 |
| 6,606,611 B1 | 8/2003 | Khan | |
| 6,707,889 B1 | 3/2004 | Saylor et al. | |
| 6,721,705 B2 | 4/2004 | Kurganov et al. | |
| 6,738,803 B1* | 5/2004 | Dodrill et al. | 709/218 |
| 6,766,313 B1* | 7/2004 | Kromann | 1/1 |
| 6,785,653 B1* | 8/2004 | White et al. | 704/270.1 |
| 6,859,776 B1* | 2/2005 | Cohen et al. | 704/270 |
| 6,970,915 B1* | 11/2005 | Partovi et al. | 709/217 |
| 7,050,976 B1 | 5/2006 | Packingham | |
| 7,072,328 B2* | 7/2006 | Shen et al. | 370/352 |
| 7,185,197 B2* | 2/2007 | Wrench, Jr. | 713/168 |
| 7,254,227 B2* | 8/2007 | Mumick et al. | 379/215.01 |
| 7,289,493 B1* | 10/2007 | Vera | 370/356 |
| 7,409,349 B2* | 8/2008 | Wang et al. | 704/270.1 |
| 7,536,639 B2* | 5/2009 | Griswold et al. | 715/234 |
| 7,672,952 B2* | 3/2010 | Isaacson et al. | 707/999.01 |
| 7,847,982 B2* | 12/2010 | Mizumukai | 358/400 |
| 7,899,829 B1* | 3/2011 | Malla | 707/741 |
| 7,920,682 B2* | 4/2011 | Byrne et al. | 379/88.18 |
| 7,933,389 B2* | 4/2011 | Kumar et al. | 379/68 |
| 2002/0004721 A1* | 1/2002 | Cha et al. | 704/270.1 |
| 2002/0034290 A1 | 3/2002 | Pershan | |
| 2002/0080927 A1* | 6/2002 | Uppaluru | 379/88.01 |
| 2002/0091524 A1 | 7/2002 | Guedalia et al. | |
| 2002/0164000 A1* | 11/2002 | Cohen et al. | 379/88.17 |
| 2003/0002637 A1* | 1/2003 | Miyauchi et al. | 379/93.01 |
| 2003/0078775 A1* | 4/2003 | Plude et al. | 704/235 |
| 2003/0139928 A1* | 7/2003 | Krupatkin et al. | 704/260 |
| 2004/0085913 A1* | 5/2004 | Baxley et al. | 370/260 |
| 2005/0238156 A1* | 10/2005 | Turner | 379/202.01 |
| 2005/0277410 A1* | 12/2005 | Ismail et al. | 455/426.2 |
| 2006/0153357 A1* | 7/2006 | Acharya et al. | 379/266.01 |
| 2006/0176805 A1 | 8/2006 | Peters | |
| 2007/0168426 A1 | 7/2007 | Ludwig et al. | |
| 2008/0002689 A1* | 1/2008 | Vera | 370/389 |
| 2008/0140416 A1 | 6/2008 | Shostak | |
| 2008/0140523 A1* | 6/2008 | Mahoney et al. | 705/14 |
| 2009/0138262 A1* | 5/2009 | Agarwal et al. | 704/235 |
| 2009/0238348 A1* | 9/2009 | Agarwal et al. | 379/93.01 |
| 2010/0031185 A1* | 2/2010 | Wilson et al. | 715/777 |
| 2011/0191696 A1* | 8/2011 | Jain et al. | 715/758 |

OTHER PUBLICATIONS

U.S. Appl. No. 11/612,787, filed Dec. 19, 2006.

White, Jim, Voice Browsing, IEEE Internet Computing, Jan. 2000, pp. 55-56.

Kennedy, C.J., Voice Browsing, retrieved Jan. 2, 2008 from Internet <URL: http://www.wirelessdevnet.com/channels/voice/features/voicebrowser.phtml>.

Danielsen, P.J., The Promise of a Voice-Enabled Web, Computer, Aug. 2000, pp. 104-106.

"Voice Browser" Activity, retrieved Jan. 27, 2008 from Internet <URL: http://www.w3.org/Voice>.

IBM Docket No. IN920070100US2, U.S. Appl. No. 12/051,148, Office Action Communication Dated Nov. 18, 2011, 11 pages.

IBM Docket No. IN920070100US2, U.S. Appl. No. 12/051,148, Notice of Allowance Dated Mar. 2, 2012, 7 pages.

Office Action Communication, U.S. Appl. No. 12/051,148, Dated Feb. 5, 2014, pp. 1-21.

* cited by examiner

TELECOM WEB BROWSERS, AND METHODS FOR DEFINING A TELECOM WEB BROWSER

CROSS-REFERENCE TO RELATED APPLICATIONS

This application is related to U.S. application Ser. No. 12/051,148 filed Mar. 19, 2008, the complete disclosure of which, in its entirety, is herein incorporated by reference.

TECHNICAL FIELD

Some embodiments of the invention relate to voice user interfaces, automatic speech recognition, text to speech synthesis, and voice sites. Various embodiments of the invention relate to browsing. Some embodiments relate to browsers.

BACKGROUND

The World-Wide Web (WWW) operates over the Internet infrastructure, enabling services such as email, web browsing, online shopping and the like. The Internet primarily provides data services to users, for example, the ability to create and personalize a website/webpage, online shopping, accessing web services, and the like. The Internet network has also been used to transmit voice and has become a parallel telecommunications network providing voice communication services through voice over Internet protocol (VoIP).

However, the information available on the Internet is not readily available to people who do not have computers or who cannot access the Internet through digital infrastructure. In typical telecommunication based networks, service providers offer basic data services such as short message service (SMS), email, sports updates, news, and the like. A disadvantage of the current telecommunication service is the limitation of an end-users' ability to provide such data services, as many users' do not have the control or ability to provide such applications. There is a need for an infrastructure that would enable a user, for example a telephone user, to provide and control data services to other telephone users.

Voice Extensible Markup Language (VoiceXML) is a markup language for creating voice user interfaces that use automatic speech recognition and text-to-speech synthesis and is described, for example, at http://www.voicexml.org, http://www.vxml.org, http://www.w3.org/TR/voicexml20/ and elsewhere. VoiceXML has tags that instruct the voice browser to provide speech synthesis, automatic speech recognition, dialog management, and audio playback.

SUMMARY

Various aspects provide a method of defining a voice browser for browsing a plurality of voice sites, at least some of the voice sites having different telephone numbers, the voice sites being configured to be accessed by telephone, the method comprising: storing information relating to voice sites visited by a voice user; and providing forward and back functions, comprising transferring a user from one voice site to another, in response to commands by the user.

Some aspects provide a Telecom Web browser for browsing a plurality of voice sites, at least some of the voice sites having different telephone numbers, the voice sites being configured to be accessed by telephone, the system comprising: circuitry configured to store information relating to voice sites visited by a voice user; and circuitry configured to provide forward and back functions, transferring a user from a first one of the voice sites to another one of the voice sites, in response to commands by the user.

Other aspects provide a computer readable medium bearing computer program code which, when loaded in an apparatus having an ability to make telephone calls and having a speech recognition device, causes the apparatus to: store information relating to voice sites visited by a voice user; and provide forward and back functions, comprising transferring a user from a first one of the voice sites to another one of the voice sites, in response to commands by the user.

Some aspects provide a voice browser for browsing a plurality of voice sites, at least some of the voice sites having different telephone numbers, the voice sites being configured to be accessed by telephone, the system comprising: a network adaptor configured to receive a telephone call from a user; circuitry configured to establish a three way conference call between a user, the voice browser, and a voice site; circuitry configured to transfer the user from one voice site to another voice site in response to a request for a transfer; data storage configured to store a history of voice sites visited by the user; data storage configured to, in response to a transfer from a first one of the voice sites to a second one of the voice sites, store data describing the phone number of the first site and data describing a location within the first voice site from where the transfer was initiated; and circuitry configured to transfer the user from the second voice site back to the first voice site, to the location from where the transfer to the second voice site was initiated, in response to a command from the user to go back.

Other aspects provide a computer readable medium bearing computer program code which, when loaded in a computer having a telephone network adaptor and speech recognition device, causes the computer to: receive a telephone call from a user; establish a three way conference call between a user, the voice browser, and a voice site; transfer the user from one voice site to another voice site in response to a request for a transfer; store a history of voice sites browsed by the user; store, in response to a transfer from a first one of the voice sites to a second one of the voice sites, data describing the phone number of the first site and data describing a location within the first voice site from where the transfer was initiated; and transfer the user from the second voice site back to the first voice site, to the location from where the transfer to the second voice site was initiated, in response to a command from the user to go back.

DETAILED DESCRIPTION OF THE ILLUSTRATED EMBODIMENTS

Figure 1:
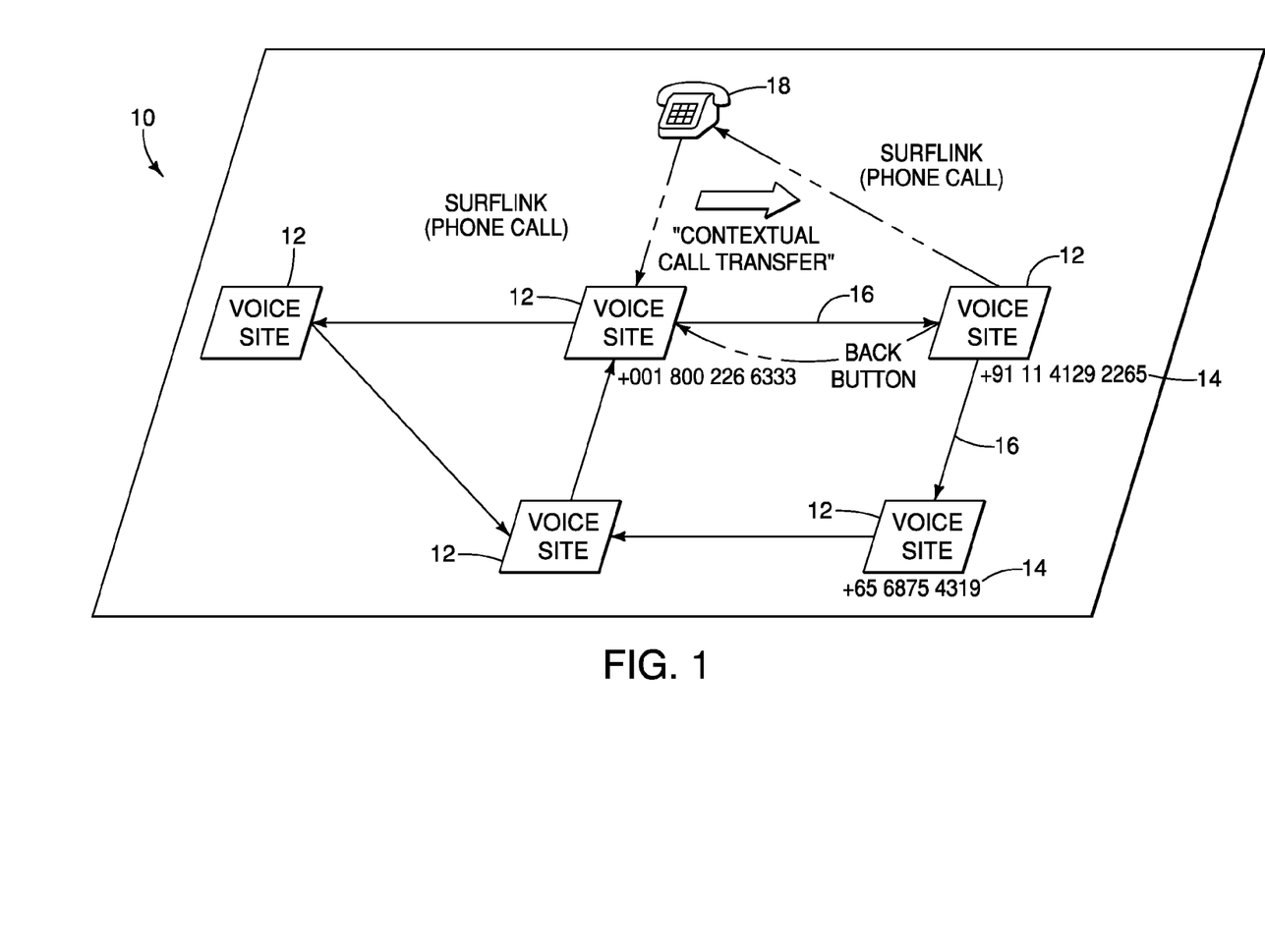
FIG. 1 is a block diagram illustrating a web of voice sites.

FIG. 1 shows a World Wide Telecom Web (WWTW) 10. The WWTW 10 is a space for information and services in which the items of interest, referred to as voice sites 12, are identified by global identifiers called VoiNumbers 14 and may be interconnected through links that we refer to as VoiLinks 16. A VoiNumber is a virtual phone number that either maps onto a physical phone number or to other uniform resource identifiers such as a Session Initiation Protocol (SIP) Uniform Resource Identifier (URI). A SIP URI is the SIP addressing schema to call another person via the Session Initiation Protocol (SIP). In other words, a SIP URI is a user's SIP phone number.

The term "VoiceSite" or "voice site" refers to a voice driven application that consists of one or more voice pages (e.g. VoiceXML files) that are hosted on servers or computers in the telecom infrastructure. VoiceSites 12 are accessed by calling up the associated VoiNumber through a telephony interface and interacting with its underlying application flow.

The term "VoiLink" refers to a link 16 from one voice site 12 to another through which a caller interacting with the source voice site can be transferred to the target voice site 12 in the context of the voice site application.

As shown in FIG. 1, the WWTW 10 encompasses/includes a web of interconnected VoiceSites 12 each of which includes a voice driven application. In some embodiments, a VoiceSite 12 can be created through a simple voice driven interface over a phone call from a phone 18. Therefore, individual subscribers can easily offer their own voice-based applications without the need for a computer. In some embodiments, one or more VoiceSites 12 are augmented to connect to services in the converged network such as Web Services available in the IT infrastructure and services in the 3G/IMS infrastructure.

Applications for the WWTW 10 can include, for example, voice kiosks, tele-banking, tele-shopping, appointment scheduling, tech support, order inquiry, package tracking, driving directions, emergency notification, wake-up, flight tracking, voice access to email, customer relationship management, prescription refilling, audio newsmagazines, real estate information, directory assistance applications and other applications that are presently available on the World Wide Web. Attention is directed to commonly assigned U.S. patent application Ser. No. 11/612,787, filed Dec. 19, 2006, titled "System and Method for Generating Voice Sites," and incorporated herein by reference.

A VoiceSite 12 is formed by one or more VoicePages (e.g. VoiceXML files) that are hosted and co-located in the telecom infrastructure. VoiceSites contain information or the application flow with which a user can interact by speaking. Subscribers can expose custom information and services through VoiceSites, individual users can set up personal VoiceSites, and enterprises can set up business VoiceSites. Links between these sites creates a network of VoiceSites 12.

What is needed is an effective system and method to browse and interact with a network of VoiceSites 12.

Figure 2:
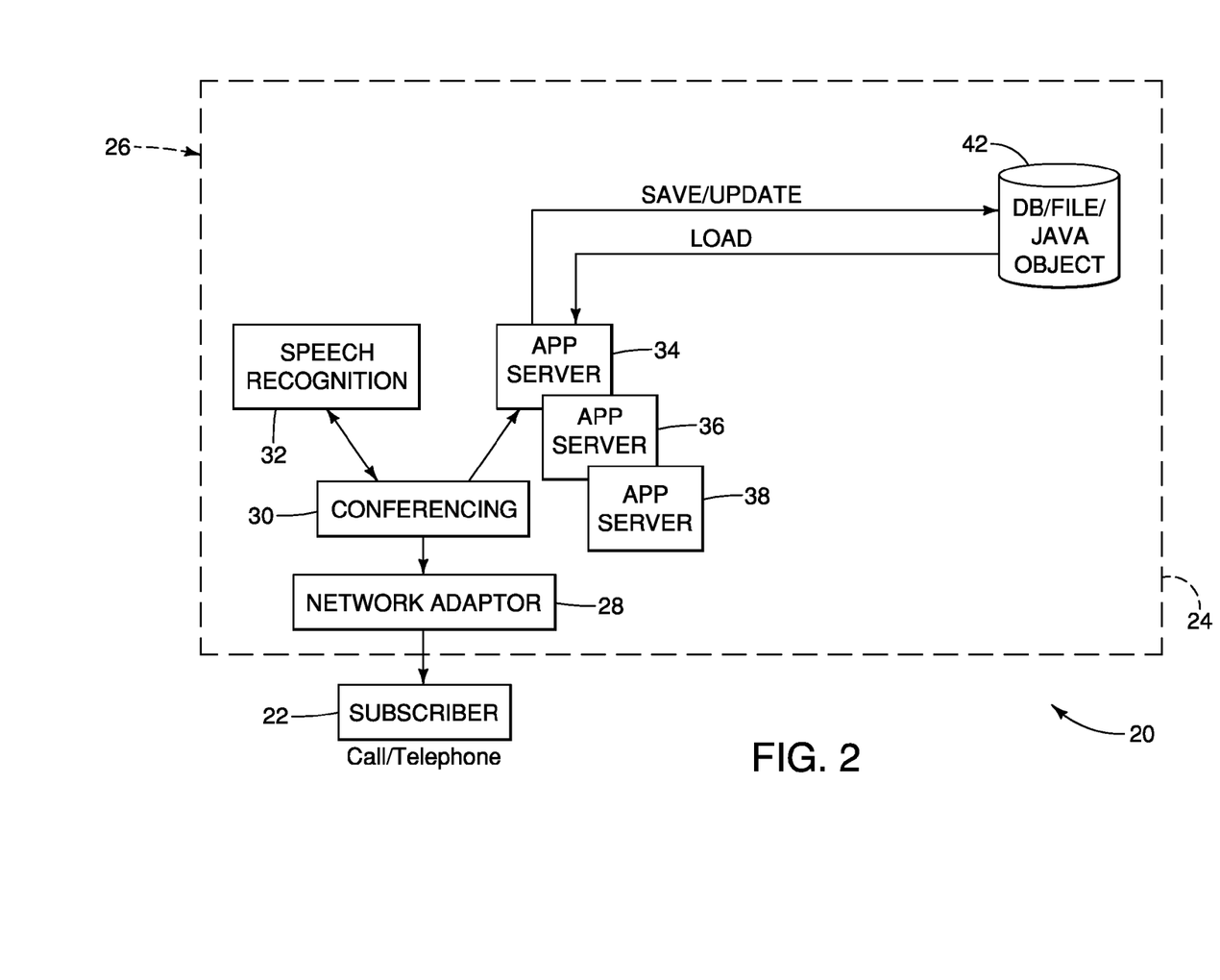
FIG. 2 is a block diagram illustrating a system according to various embodiments.

FIG. 2 is a hardware block diagram showing a system 20 embodying various aspects of the invention. A subscriber 22 interacts with a Telecom Web browser 24 to browse VoiceSites. The Telecom Web browser 24, in some embodiments, is defined by a special VoiceSite 12, given reference numeral 26 in FIG. 2, which allows users to navigate and interact with a network of VoiceSites 12. An example of a VoiceSite is described in the above-incorporated patent application. FIG. 2 shows another example of a VoiceSite that defines the Telecom Web browser 24. In the illustrated embodiment, the Telecom Web browser 24 includes a network adaptor 28. More particularly, in the illustrated embodiment, the network adaptor 28 is a Computer Telephony Integration (CTI) device or card. A user or subscriber connects to the Telecom Web browser 24 by calling or telephoning a phone number, which, in operation, is answered by the network adaptor 28.

The VoiceSite 26 further includes a Voice Browser that handles the calls and interprets VoiceXML language from the applications deployed in the App Servers (34, 36 and 38). It also includes conferencing equipment 30 for allowing transfers from one voice site to another, such as by forwarding the user from one phone number to another. For example, in one embodiment, the conferencing equipment 30 is defined by a computer running Genesys conferencing software. An example of a computer that could be used for the conferencing equipment 30 is an X-225 series computer. Other types of computers are possible.

The VoiceSite 26 further includes a speech recognition device 32. In some embodiments, the speech recognition device converts speech from voice sites to text for processing. In some embodiments, the speech recognition device 32 converts verbal commands from a user to text for processing. The speech recognition device 32 may be defined, for example, by a computer running WVS or Nuance software. An example of a computer that could be used for the speech recognition device 32 is a Z-Pro series computer sold by International Business Machines Corporation. Other types of computers are possible.

The VoiceSite 26 further includes a plurality of application servers 34, 36, and 38. While three application servers are shown in FIG. 2, it should be apparent to a person skilled in the art that other numbers could be employed as well. The application servers 34, 36, and 38 may be defined, for example, by a computer. An example of a computer that that could be used for the application servers 34, 36, and 38 is an X-225 series server sold by International Business Machines Corporation. Other types of computers are possible.

The VoiceSite 26 further includes a data storage device 40 such as a database, file, or object, for example a java object. The data storage device 40 may be defined, for example, by a computer. An example of a computer that that could be used for the data storage device 40 is an X-225 series server sold by International Business Machines Corporation. Other types of computers are possible.

The application servers 34, 36, and 38 save or update data to the data storage device 40 and load data from the data storage device 40.

Figure 3:
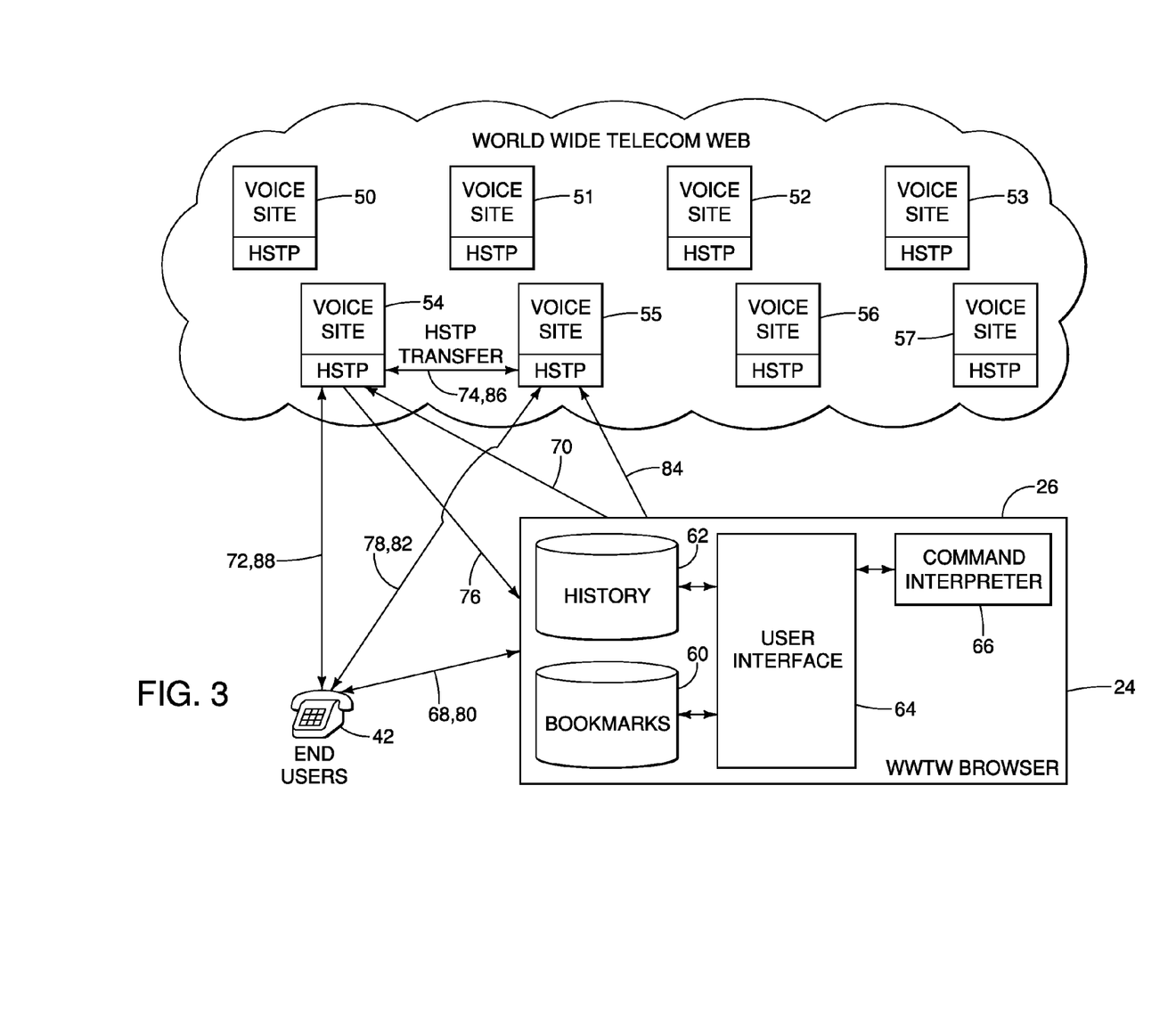
FIG. 3 is a block diagram illustrating methods of defining a voice browser and a method of browsing voice sites, in accordance with some embodiments.

FIG. 3 illustrates methods in accordance with various embodiments, including a method of defining a World Wide Telecom Web (WWTW) Telecom Web browser 24 for allowing each of a plurality of users 42 to browse a plurality of VoiceSites 50-57 (substantially similar to VoiceSites 12 of FIG. 1), at least some of which have different phone numbers and are configured to be accessed by phone. In the embodiment shown in FIG. 3, the Telecom Web browser 24 is defined by VoiceSite 26.

The Telecom Web browser 24 is able to open a new VoiceSite 55, from a VoiceSite 54 that is being browsed, by specifying the address (e.g., phone number) of the new VoiceSite.

The Telecom Web browser 24 allows each user 42 to go back or forward while navigating VoiceSites 50-57, such as by pressing predetermined keys on a phone's keypad or by following instructions from a VoiceSite.

The Telecom Web browser 24 allows respective users 42 to set a home page and to bookmark VoiceSites, by saving information in a bookmarks database, file, or object 60. The Telecom Web browser 24 also maintains a history of VoiceSites 50-57 browsed by respective users 42, by saving history information in a history database, file, or object 62.

More particularly, the Telecom Web browser 24 also includes a user interface 64, and command interpreter 66, and saves bookmarks and history in response to the instructions received from a user by the user interface 64, as interpreted by the command interpreter 66.

The Telecom Web browser 24 allows respective users 42 to browse multiple voice sites simultaneously. This is analogous to tabbed browsing available on current web browsers. To do this, the Telecom Web browser 24 pauses a VoiceSite or puts it on hold while a user is browsing elsewhere. The VoiceSites 50-57 support this ability to be placed on hold or to be paused. The VoiceSites 50-57 do not timeout while a user is elsewhere and save the state of a conversation prior to a transfer. The Telecom Web browser 24 also supports the ability to fast forward or rewind until reaching a keyword.

In operation, in order to call a VoiceSite, a user 42 first calls 68 the Telecom Web browser 24. The Telecom Web browser 24 asks the user 42 which VoiceSite to visit. The Telecom Web browser 24 then creates a conference call 70, 72 between the user 42 and the target VoiceSite, e.g. VoiceSite 54. In some embodiments, the browser uses HSTP (a high speed transfer protocol, such as the one described in The MultiStream protocol: a highly flexible high-speed transport protocol, by La Porta, T. F.; Schwartz, M. IEEE Journal on Selected Areas in Communications; Volume 11, Issue 4, May 1993 Pages 519-530) to transfer the call from the user 42 to the target VoiceSite 54. The browser creates a log in the history file, database, or object 62. If the user 42 selects this VoiceSite 54 as a favorite, the Telecom Web browser 24 stores information in the bookmarks file, database or object 60 indicating that this VoiceSite 54 is a favorite of this user 42.

The Telecom Web browser 24 supports "back," "forward," and "bookmark" commands from a user 42 among other things.

If a user 42 asks to be connected to a new VoiceSite 55, the Telecom Web browser 24 disconnects the call to the VoiceSite 54 and connects (e.g., after dialing) to the new VoiceSite 55. In some embodiments, this happens by the VoiceSite 54 transferring the call and context to the VoiceSite 55. Examples of context include caller identification and the dialed number. Another example of context includes the interactive voice response (IVR) menu option in the source IVR, user details, and target IVR menu option to switch to. The context for an online shopping application may include amount to be charged or account to be credited from. For the Telecom Web browser 24, additional context transferred includes the phone number of the previous VoiceSite 50-57 visited.

In other embodiments, the call transfer happens by the VoiceSite 54 transferring the context, or the call and context, to the Telecom Web browser 24, and the Telecom Web browser 24 transferring the user to the second VoiceSite 55. In some embodiments, when a user 42 browses to the new VoiceSite 55 from a first VoiceSite 54, an HSTP transfer 74 occurs and HSTP passes 76 information to the Telecom Web browser 24 and this information is stored in the history file, database, or object 62.

In some embodiments, context and call information from one VoiceSite 50-57 is stored to the Telecom Web browser 24 when there is a transfer. As an example, assuming a user has browsed four VoiceSites 50-57 before arriving to a fifth VoiceSite. If the user says "back" to go back to the previously browsed VoiceSite, the Telecom Web browser 24 therefore knows the phone number associated with the previous VoiceSite. The Telecom Web browser 24 also knows the location within the previous VoiceSite from which the user moved to the current VoiceSite. All this information forms the "context and call information" from the earlier VoiceSite and this is transferred to the browser when the call moved from fourth VoiceSite to the fifth VoiceSite.

In some of the embodiments described above, the Telecom Web browser 24, the browsed VoiceSite 54, and the user 42 are in a three party conference call. In such a situation, the user utterances are listened by the Telecom Web browser 24 as well as the browsed VoiceSite 54. The Telecom Web browser 24 is configured to understand whether a user utterance is for the browser or for the VoiceSite 54. If it is for the VoiceSite 54, it is ignored by the Telecom Web browser 24. But if the user utterance is for the Telecom Web browser 24, the Telecom Web browser 24 recognizes that and performs the appropriate action. For example, the browser is configured to recognize and distinguish certain browsing keywords such as forward, back, bookmark, etc. This is called "disambiguating."

In some embodiments, the user 42 switches to another channel to ask 80 the browser 42 to go "back" to the previous VoiceSite 54. The browser 42 instructs 84 the HSTP layer on the VoiceSite 55 to transfer the user back to VoiceSite 54 and a transfer 86 occurs from the VoiceSite 55 to the VoiceSite 54 so that the user 42 is then transferred 88 to the VoiceSite 54.

A single Telecom Web browser 24 can be used to browse any of multiple VoiceSites in the World Wide Telecom Web. In operation, (see FIG. 4) when a Telecom Web browser 24 is a VoiceSite, a user 42 calls 90 a Telecom Web browser 24 to browse 92 any VoiceSite 50-58. A conference call is established including the Telecom Web browser 24, the user 42, and the VoiceSite 54. The connection to a new VoiceSite 54 is logged in history 62.

Figure 4:
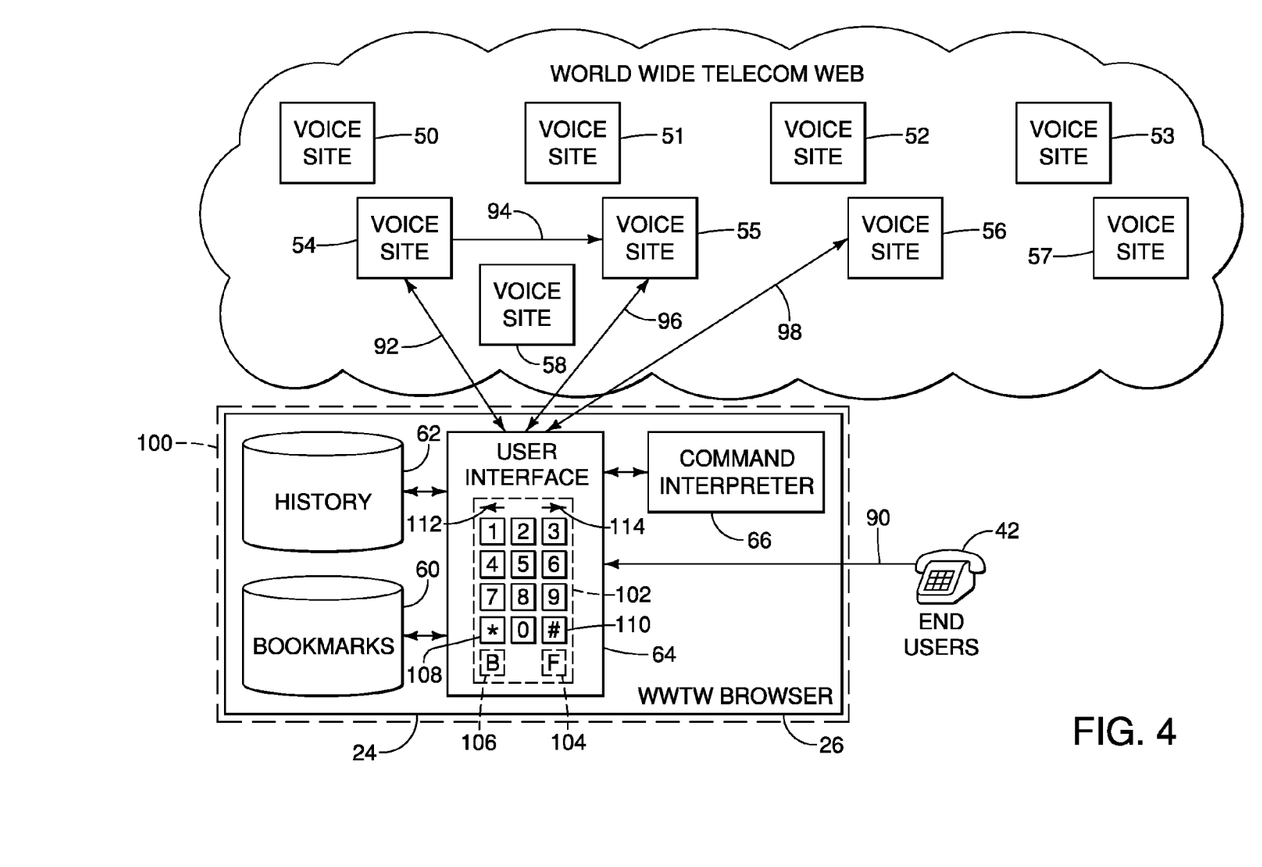
FIG. 4 is a block diagram illustrating methods of using a voice browser, according to some embodiments.

A request for a call transfer from one VoiceSite 54 to another VoiceSite 55 is processed by the Telecom Web browser 24. In some embodiments, this happens by the VoiceSite 54 transferring 94 the call and context to the VoiceSite 55. In some embodiments, the call transfer happens by the VoiceSite 54 transferring the context or the call and context to the Telecom Web browser 24, and the Telecom Web browser 24 transferring the user to the second VoiceSite 55. The call transfer request is then completed 96.

The Telecom Web browser 24 enables tabbed browsing 98, as well as bookmarking of favorite voice sites, which are stored in bookmarks 60.

In alternative embodiments, a browser actually resides on a user's phone 100. In some embodiments, the browser commands are provided by special keys on the phone. For example, some additional keys can be added to a standard dialpad 102, such as an "F" key 104 for forward and a "B" key 106 for backward. Alternatively, existing keys can be overlayed to perform the desired functions, such as "*" and "#" 108 and 110, or arrow keys 112 and 114. Thus, in some embodiments, the user will not have to speak to the WWTW browser 24, he or she can just use the keys to browse the VoiceSites 50-57. However, he or she will typically still speak with the VoiceSite. In embodiments where the browser resides on a phone 100, the history and bookmarks are maintained in the phone itself, such as in databases, files, or objects 60, 62 on the phone.

In other embodiments where the browser resides on a user's phone 100, the browser on the phone 100 supports speech recognition and synthesis. In such embodiments, the user's phone 100 interprets voice commands such as go-back and add-to-bookmark locally and will not transmit these commands to the VoiceSite. In these embodiments, the history and bookmarks are maintained in the phone itself.

The command interpreter 66 interprets the commands that are specific to the Telecom Web browser 24. These are commands spoken by the user. Examples include "go back", "add to bookmark", and "go back two sites". The interpreter understands such commands from the user and then performs the desired operation at the Telecom Web browser 24. In some embodiments, the hardware defining a Telecom Web browser 24 will be substantially similar to the hardware used to define a VoiceSite 12. For embodiments where the browser is on a phone 100, the command interpreter 66 will include a microphone, speaker, processor, and memory (not shown).

Thus, the Telecom Web browser 24 browser can have alternative physical embodiments including one as a VoiceSite and another one where the browser 24 is implemented within a phone instrument. In the first case, the Telecom Web browser 24 can be shared among multiple users.

Each of these embodiments have different modes of operation. In the Voice Site embodiment, the first mode of operation involves the browser, the user and the telephoned VoiceSite are connected via a conference call. In the second mode of operation, the user is first connected to the browser which then transfers his session to the called voice site. Later, each called voice site informs the browser as and when the user's session gets transferred to the next voice site.

When included in a phone instrument embodiment, the Telecom Web browser 24 comprises client side software similar to a web browser. The first mode of operation in this case, allows voice commands from the user. In these embodiments, a speech recognition engine is embedded in the phone instrument. The second mode of operation uses pre-designated keys on the device to accept browsing commands.

The features supported by the Telecom Web browser include Multi-tabbed browsing. This feature enables a user to browse multiple VoiceSites simultaneously. This is similar to multi-tabbed browsing available in modern web browsers. One difference is that in this case, each session results in an active phone call, though with the use of VoIP facility a physical channel need not be tied up for each voice call.

In operation, for some VoiceSite embodiments, the user calls up the Telecom Web browser VoiceSite first and requests it to open a new VoiceSite. As a result of this command, the Telecom Web browser VoiceSite creates a call connection between the user and the requested VoiceSite. For the user, this becomes the second active call on his phone, the first active call being one to the Telecom Web browser. The Telecom Web browser supports, and the called VoiceSites optionally support, navigational commands. Depending upon the case applicable, the user can, in some embodiments, issue navigational commands by making call to the Telecom web browser as the active one (through phone features) and then issuing the command to the Telecom Web browser. Alternatively, in some embodiments, the user issues the navigational command to the VoiceSite being visited which is then relayed the Telecom Web browser through the HSTP layer at that site.

In these embodiments, the non-active calls to other VoiceSite are put on hold while a user is browsing elsewhere. The VoiceSites support this ability to be placed on hold or to be paused; i.e. they do not do a normal timeout while a user is elsewhere and save the state of a conversation prior to a transfer (if any, instructed by the browser).

For some embodiments with a Telecom Web browser included on phone, the user interacts with the browser directly. In fact, in some embodiments, all the voice commands are received by the local Telecom Web browser, interpreted and acted upon if meant for it. Otherwise, the VoiceSite being browsed acts upon it. In this case, the Telecom Web browser does not need to rely on HSTP layer for executing the navigational commands.

The Telecom Web browser also supports saving of browsing history, in some embodiments. In some embodiments, when a user browses a VoiceSite, the Telecom Web Browser stores the phone number and the application context of the VoiceSite in the history database. In some embodiments, the storage is organized as per the browsing trace captured with respect to time. The application context and the phone number form the unique identifier for a specific VoicePage in the VoiceSite. The application context is an anchor in the voice site, in some embodiments. In addition to this unique identifier, the Telecom Web Browser also stores a tag to represent the VoiceSite, in some embodiments. This tag is used to tell the user about the VoiceSite. The tag can come from meta-data of the VoiceSite or from the first few words of the VoiceSite. Thus, the history database contains the phone number, the application context and the tag for the VoiceSite.

The Telecom Web browser also supports bookmarks, in some embodiments. For example, in some embodiments, when a user browses a VoiceSite, the user can say "bookmark" to the Telecom Web Browser to bookmark a particular VoiceSite. Other commands could be employed for this function. The application context and the phone number form the unique identifier for a specific VoicePage in the VoiceSite. This unique identifier is stored in the bookmarks file, object, or database. In addition to this unique identifier, the Telecom Web Browser of some embodiments also stores a tag to represent the VoiceSite. This tag is used to tell the user about the VoiceSite. The tag can come from meta-data of the VoiceSite or from the first few words of the VoiceSite, or the Telecom Web Browser can ask the user to say a few words that are used as a tag for the VoiceSite. So, in some embodiments, the bookmark database contains the phone number, the application context and the tag for the VoiceSite. When the user wants to navigate the bookmarks, the tags of all the bookmarks can be played to the user, in some embodiments, and the user can select from one of the options. If the number of bookmarks are too many, then the Telecom Web browser can structure the bookmarks in directories for easier navigation.

The Telecom Web browser also supports cookies, in some embodiments. Cookies enable the VoiceSites visited by a user to recognize a repeat visit by the same user. In these embodiments, the visited VoiceSite bundles some context information (such as the user-id/password on the voice site, the voice site address etc.) into a cookie and supplies it to the user's Telecom Web browser, e.g., through HSTP. While visiting a voicesite, the Telecom Web browser searches its local cookie repository and pulls out any cookies that may have been sent by that VoiceSite previously. This cookie object is then sent to the VoiceSite through HSTP.

The Telecom Web browser also supports navigational commands, such as forward, back, forward 'n' steps, back 'n' steps, connectToNewVoiceSite, bookmarkCurrentSite, retrieveBookmarkedSite etc.

Some embodiments comprise software, which includes but is not limited to firmware, resident software, microcode, etc.

Furthermore, aspects of the invention can comprise a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. In some embodiments, the data processing system is defined by a server or computer, or multiple servers or computers.

While only a few voice sites 12 and 52 are illustrated in FIGS. 1, 3, and 4, the number of voice sites is not restricted by the system and voice sites can be distributed across organizations and geographic locations.

In compliance with the patent statutes, fairly specific embodiments, including preferred embodiments, have been described. It is to be understood, however, that the patent protection sought is not to be limited to the specific embodiments shown and described. The protection sought is to be limited only by the following claims, which are to be afforded full scope, and to be appropriately interpreted in accordance with the doctrine of equivalents. It should be readily apparent that the improvements claimed herein provide more than predictable use of prior art elements.

The invention claimed is:

1. A method comprising:
   storing, at a computing telephony device, information relating to voice sites visited by a user, said voice sites being configured to be accessed by telephone, at least some of said voice sites having different identifiers;
   providing, by said computing telephony device, navigation functionalities comprising transferring a telephone connection by said user from a first one of said voice sites to another one of said voice sites, in response to voice commands by said user; and
   browsing a plurality of voice sites simultaneously using a World Wide Telecom Web (WWTW) browser, said browsing comprising:
      said WWTW browser receiving a voice command from said user to browse a target voice site, and
      said WWTW browser creating a conference call with said user and said target voice site, such that, once said browser establishes a connection between said target voice site and said user, said user communicates with said target voice site on a direct line and said WWTW browser monitors said connection between said target voice site and said user on a separate line,
   said browsing said plurality of voice sites initiating a plurality of active phone call sessions,
   said computing telephony device comprising:
      a network adaptor;
      a voice browser; and
      conferencing equipment that transfers said voice browser from one voice site to another.

2. The method in accordance with claim 1, said navigation functionalities comprising at least one of a forward, a back and a refresh function.

3. The method in accordance with claim 1, further comprising:
   distinguishing user utterances as being directed to one of said target voice site and said WWTW browser; and
   recognizing voice commands from said user and responding to said voice commands from said user on said WWTW browser.

4. The method in accordance with claim 3, further comprising:
   allowing said user to browse multiple voice sites on said WWTW browser.

5. The method in accordance with claim 1, further comprising:
   establishing a three party conference call using said conferencing equipment; and
   coupling a user's telephone to a voice site using said WWTW browser.

6. The method in accordance with claim 1, said WWTW browser comprising a device that converts sound into electrical signals that can be transmitted over distances and then converts received signals back into sounds.

7. The method in accordance with claim 6, said device comprising at least one of a telephone, a mobile phone, a personal digital assistant and a touchtone phone.

8. The method in accordance with claim 1, further comprising:
   navigating across voice sites that have different phone numbers using said WWTW browser.

9. The method in accordance with claim 1, further comprising:
   disambiguating voice commands intended for said voice browser using said WWTW browser.

10. The method in accordance with claim 1, further comprising:
    transferring a user call from said first one of said voice sites to said another one of said voice sites by storing call and context information from said first one of said voice sites in said voice browser; and
    using said voice browser to initiate a call to said another one of said voice sites using said WWTW browser.

11. The method in accordance with claim 10, said first one of said voice sites being configured to transfer said call and context information to said another one of said voice sites.

12. The method in accordance with claim 1, further comprising:
    said WWTW browser putting a voice site on hold and switching across active voice site connections.

13. The method in accordance with claim 1, further comprising:
    storing user history including phone number and context of previously browsed voice sites on said WWTW browser thereby supporting back and forward browsing commands.

14. The method in accordance with claim 1, further comprising:
    creating a bookmark for any browsed voice site using said WWTW browser.

15. The method in accordance with claim 14, further comprising:
    accessing said bookmark using said WWTW browser.

16. A method comprising:
    storing information, at a computing telephony device, relating to voice sites visited by a user, said voice sites being configured to be accessed by telephone, at least some of said voice sites having different identifiers;
    providing, at said computing telephony device, navigation functionalities comprising transferring a telephone connection by said user from a first one of said voice sites to another one of said voice sites, in response to voice commands by said user;
    responsive to a voice command from said user to browse a first voice site, opening said first voice site using a World Wide Telecom Web (WWTW) browser by initiating a first active conference call with said user and said first voice site, such that, once said browser establishes a connection between said first voice site and said user, said user communicates with said first voice site on a first direct line and said WWTW browser monitors said connection between said first voice site and said user on a separate line;

responsive to a voice command from said user to browse a second voice site, pausing said conference call between said user and said first voice site by said WWTW browser; and opening said second voice site using said WWTW browser by initiating a second active conference call with said user and said second voice site, such that, once said browser establishes a connection between said second voice site and said user, said user communicates with said second voice site on a second direct line and said WWTW browser monitors said connection between said second voice site and said user on a separate line, while said first voice site is paused in said WWTW browser, said first and second voice sites being simultaneously accessed by said WWTW browser by said first and second active conference call, respectively.

17. The method in accordance with claim 16, said pausing said first voice site puts on hold said first voice site.

18. The method in accordance with claim 16, further comprising:

preventing a timeout of said first voice site using said WWTW browser during an interval of time said first voice site is being paused.

19. The method in accordance with claim 16, further comprising:

saving a state of conversation of said first voice site using said WWTW browser during an interval of time said first voice site is being paused.

* * * * *